(12) United States Patent
Ichimasa et al.

(10) Patent No.: US 6,246,839 B1
(45) Date of Patent: *Jun. 12, 2001

(54) APPARATUS FOR COPING WITH POSITIONAL DEVIATIONS OF FILM

(75) Inventors: Shoji Ichimasa; Kazuo Nakagawa, both of Kanagawa-ken (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/652,113

(22) Filed: May 23, 1996

(30) Foreign Application Priority Data

| Jun. 1, 1995 | (JP) | 7-135236 |
| Jun. 1, 1995 | (JP) | 7-135472 |
| Feb. 20, 1996 | (JP) | 8-031908 |

(51) Int. Cl.⁷ .................................................. G03B 1/00
(52) U.S. Cl. ........................................... 396/406; 396/409
(58) Field of Search ..................................... 396/387, 395, 396/397, 406, 409

(56) References Cited

U.S. PATENT DOCUMENTS

| 4,987,431 | | 1/1991 | Harvey ................................ 354/21 |
| 5,247,321 | | 9/1993 | Kazami .............................. 354/106 |
| 5,345,286 | * | 9/1994 | Stiehler ............................. 396/397 |
| 5,481,331 | * | 1/1996 | Cocca et al. ..................... 396/406 |
| 5,489,957 | * | 2/1996 | Weaver ............................. 396/418 |
| 5,506,648 | * | 4/1996 | Kazami et al. ................... 396/409 |
| 5,576,785 | * | 11/1996 | Kazami et al. ................... 396/397 |

FOREIGN PATENT DOCUMENTS 0464653   1/1992   (EP) .

* cited by examiner

Primary Examiner—David M. Gray
(74) Attorney, Agent, or Firm—Robin, Blecker & Daley

(57) ABSTRACT

An apparatus for coping with positional deviations of a film includes a determination circuit for determining a positional deviation of the film which is at a stop, a time measuring circuit for measuring time, and a positional deviation correcting part for correcting the positional deviation of the film in response to the determination circuit and the time measuring circuit.

17 Claims, 14 Drawing Sheets

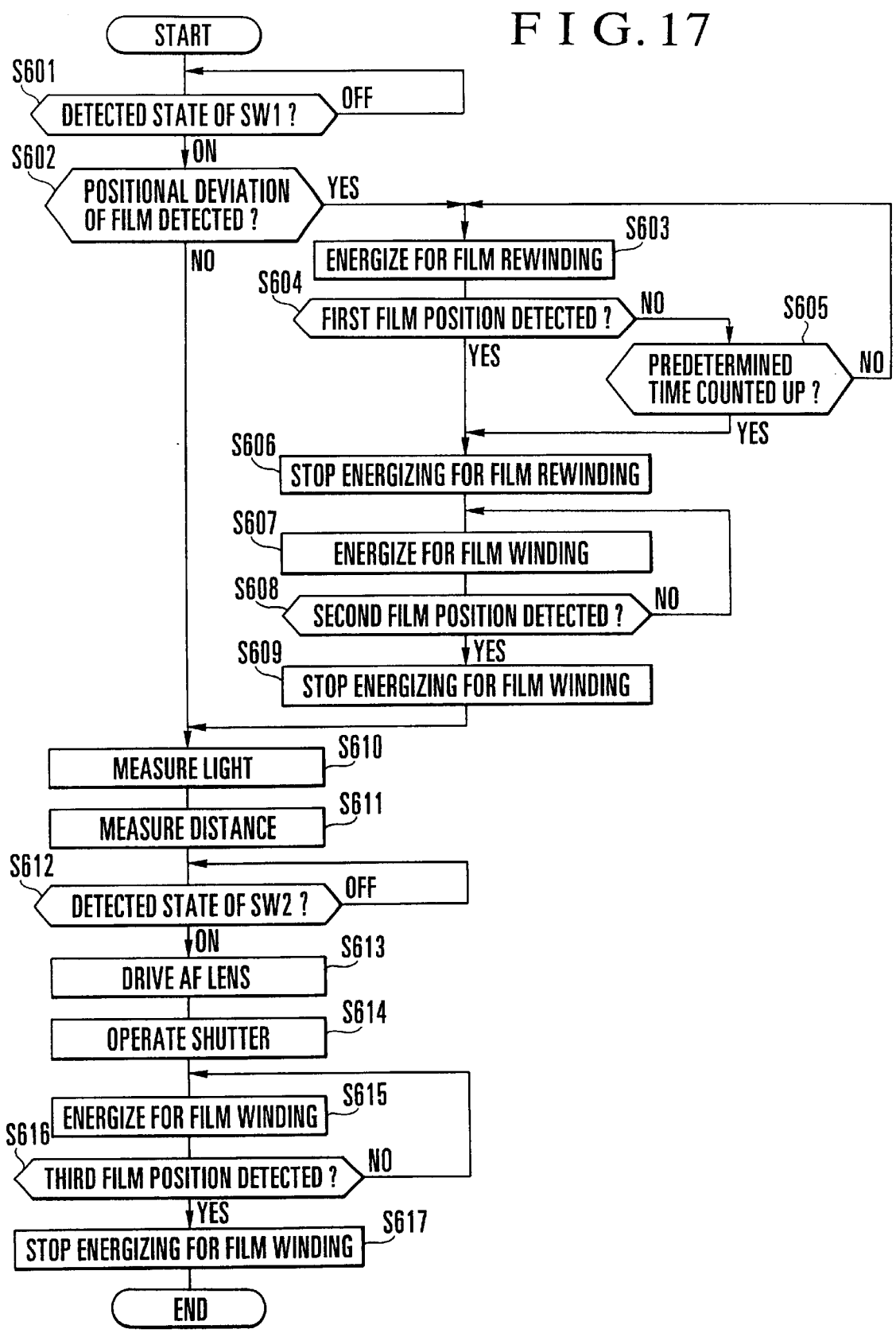

APPARATUS FOR COPING WITH POSITIONAL DEVIATIONS OF FILM

BACKGROUND OF THE INVENTION

1. Field of the Invention

This invention relates to an apparatus for coping with positional deviations of a film pulled out from a film cartridge.

2. Description of the Related Art

In the conventional 35 mm film cartridge, a film is arranged to be pulled out from a film exit part of the film cartridge through a flocked fabric part provided for blocking light. The pulled-out film is transported within a camera so as to be stopped in a position set relative to an aperture provided in the camera. Then, the flocked fabric part of the film cartridge effectively prevents the film which is at a stop from being easily caused to deviate from the set position, for example, by a falling impact, a shake or the like of the camera.

A film cartridge of another type disclosed, for example, in Japanese Laid-Open Patent Application No. HEI 2-201441, on the other hand, is provided with a light-shielding opening/closing door, which is disposed at a film exit part of the film cartridge, in place of the light-blocking flocked fabric part of the conventional film cartridge mentioned above. The light-shielding opening/closing door imposes little load on the film at the film exit part. Therefore, the position where the film is at a stop with respect to the aperture of the camera tends to deviate from the set position. Such a positional deviation of the film might cause one photographic picture plane to overlap another on the film. To prevent the positional deviation of the film, a certain mechanical stopper or the like would be required to be disposed in the camera.

However, the provision of the mechanical stopper or the like for this purpose hinders efforts to reduce the size and cost of the camera.

SUMMARY OF THE INVENTION

In accordance with one aspect of this invention, there is provided an apparatus for coping with positional deviations of a film, which comprises determination means for determining a positional deviation of the film which is at a stop, time measuring means for measuring time, and positional deviation correcting means for correcting the positional deviation of the film in response to the determination means and the time measuring means, so that such an inconvenience that a falling impact, a shake or the like of the apparatus causes overlapping of photographic picture planes by producing the positional deviation of the film which is at a stop can be prevented with a configuration advantageous for reducing the size and cost of the apparatus.

The above and other aspects and features of this invention will become apparent from the following detailed description of preferred embodiments thereof taken in connection with the accompanying drawings.

BRIEF DESCRIPTION OF THE DRAWINGS

FIG. 17 is a flow chart showing an operation of the CPU 41 of FIG. 8 performed in the fifth embodiment.

DETAILED DESCRIPTION OF THE PREFERRED EMBODIMENTS

Preferred embodiments of this invention are described below with reference to the drawings.

A first embodiment of this invention will be described by using FIGS. 1 to 5.

Figure 1:
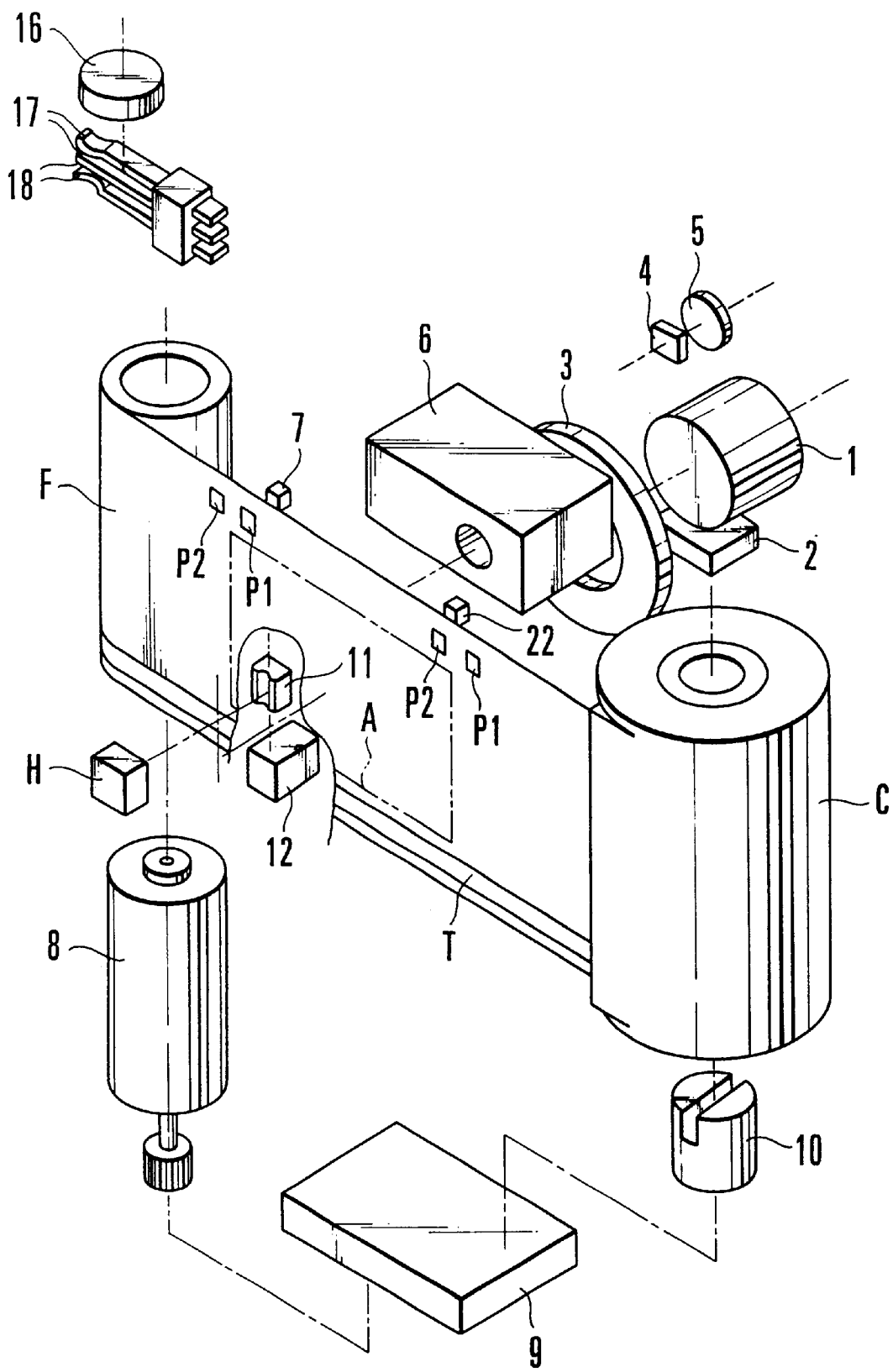
FIG. 1 is an oblique view showing the internal arrangement of essential parts of a camera which is a first embodiment of this invention.

FIG. 1 shows in a block diagram the internal arrangement of essential parts of a camera arranged as the first embodiment of this invention. The illustrated camera in FIG. 1 includes a photo-taking lens 1, a lens drive 2 having a lens actuator arranged to drive the photo-taking lens 1 and a lens encoder arranged to generate a lens position signal, a lens shutter 3, a light measuring sensor 4 provided for AE (automatic exposure), a lens 5 arranged to determine the light receiving angle of the light measuring sensor 4, a block 6 having a distance measuring sensor 6a and a viewfinder, a second photo-reflector 7 arranged to generate a signal to be used for indexing one frame portion of a film F and a signal indicating the timing of an end of information writing by detecting perforations P1 and P2 of the film F, a film transporting motor 8 disposed within a film take-up spool, a gear train 9 arranged to perform speed reduction and change-over between film winding and film rewinding, and a rewinding fork 10 provided for film rewinding.

The film F is contained in the film cartridge C. The film F is provided with a magnetic storage part, i.e., a magnetic recording track T, on the film base side thereof. The above-stated perforations P1 and P2 of the film F correspond to a photographic picture plane A. The film cartridge C is provided with a film transport opening arranged to be opened and closed by means of a light-shielding door which is not shown. In transporting the film F, the light blocking door is open.

The camera further includes a magnetic head H arranged to write or read information into or out of the magnetic track T provided on the film F, a pad 11 arranged to push the film F against the magnetic head H and provided with a recess in its middle part for closer contact of the film F with the head gap of the magnetic head H, a pad advancing-retracting control mechanism 12 arranged to move the pad 11 forward to push the pad 11 against the magnetic head H through the film F at a predetermined pushing force in a state of having the film F in between the pad 11 and the magnetic head H in writing and reading information into and from the magnetic track T during transporting of the film F, a shutter release button 16, a switch (SW1) 17 arranged to start light and distance measuring actions by a first stroke of the shutter release button 16, a switch (SW2) 18 arranged to start a sequence of actions to be performed to open the shutter and to transport the film F by a second stroke of the shutter release button 16, a lid switch 29 (FIG. 2) arranged to be turned on when a cartridge chamber lid of the camera is closed, and a first photo-reflector 22 arranged to generate a signal for deciding the information writing frequency of the magnetic head H and a signal for the timing of terminating the information writing process by detecting the perforations P1 and P2 of the film F.

Figure 2:
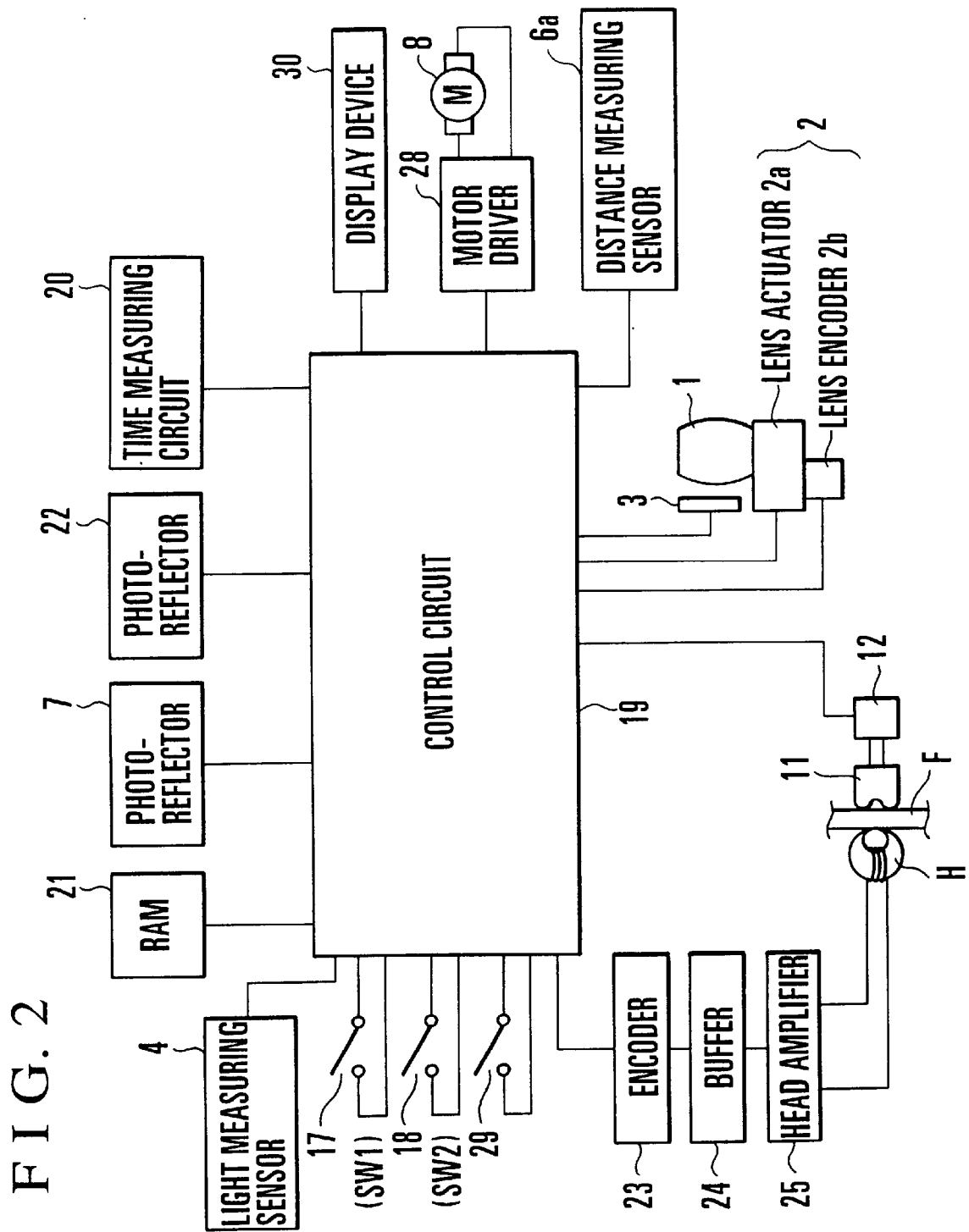
FIG. 2 is a block diagram showing the electrical arrangement of essential parts of the camera of FIG. 1.

FIG. 2 shows the circuit arrangement of essential parts of the camera described above. Referring to FIG. 2, the circuit arrangement includes a control circuit 19 arranged to control various actions of the camera, a known time measuring circuit 20, a RAM 21 arranged to store information of varied kinds including the aperture value and the shutter speed to be used in photographing, an encoder 23, a buffer 24, a head amplifier 25, a motor driver 28 arranged to drive the film transporting motor 8, and a display device 30 which is, for example, a liquid crystal display device and is arranged to provide displays of varied kinds.

Figure 3:
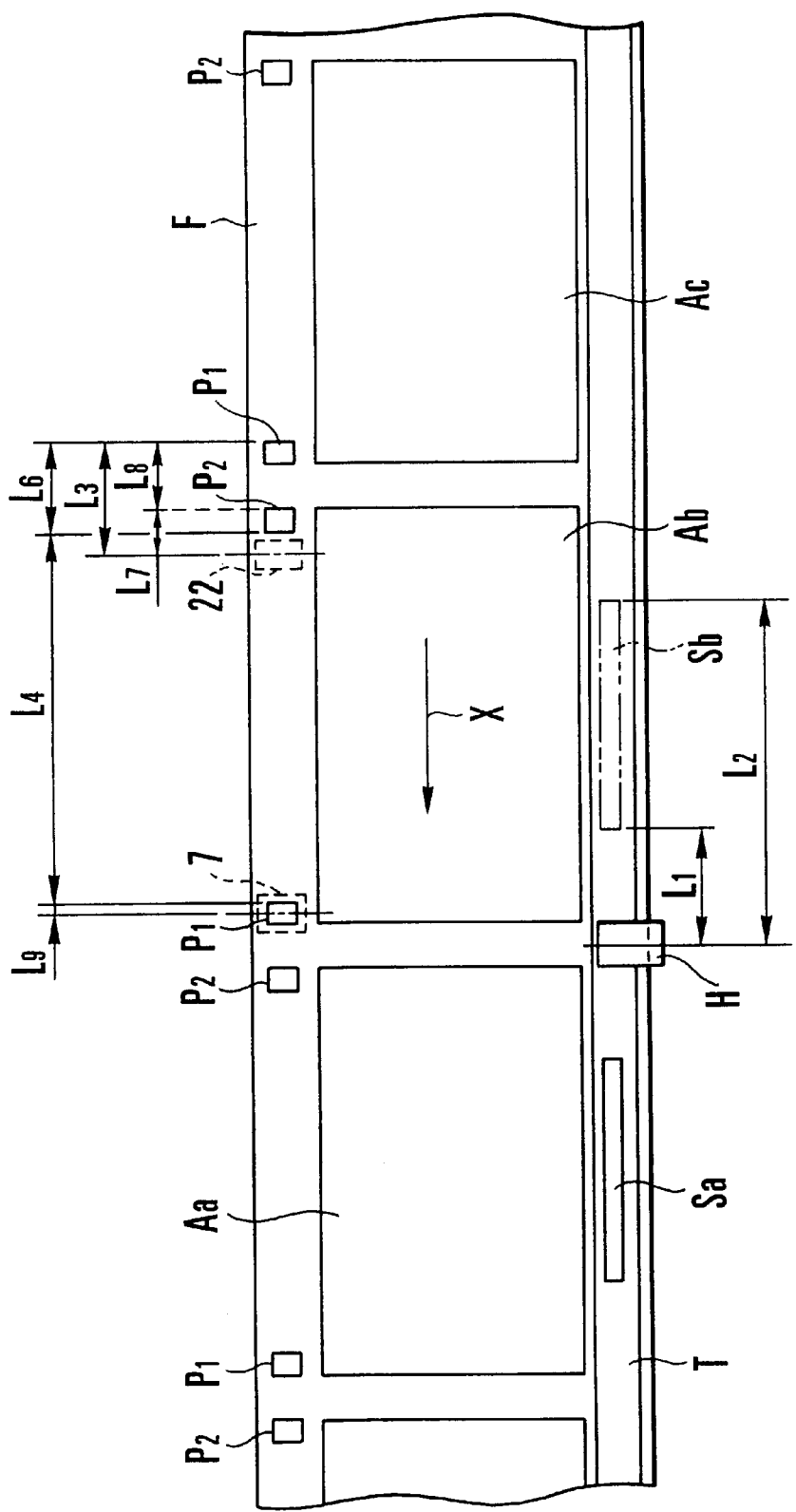
FIG. 3 is a front view taken from on the side of a film base surface, showing a relationship between photo-reflectors and a film (photographic picture planes) in the first embodiment.

FIG. 3 shows a relationship between the film F and the first and second photo-reflectors 22 and 7. In FIG. 3, reference symbol Aa denotes a photographic picture plane which has already been exposed to light for photographing. Reference symbol Ab denotes another photographic picture plane which is currently located in the position of an aperture so as to be ready for an exposure. Reference symbol Ac denotes a further photographic picture plane to be used for photographing next time subsequently to the photographic picture plane Ab. Reference symbol T denotes a magnetic track provided on the film F as mentioned in the foregoing. Reference symbol Sa denotes an area in which photographic information such as a shutter time (speed), a date of photographing, etc., is recorded by the magnetic head H when the exposed picture plane Aa is wound up. Reference symbol Sb denotes an area in which the information is to be recorded presently by the magnetic head H. Reference symbol X denotes a direction in which the film F is being wound up.

Figure 4:
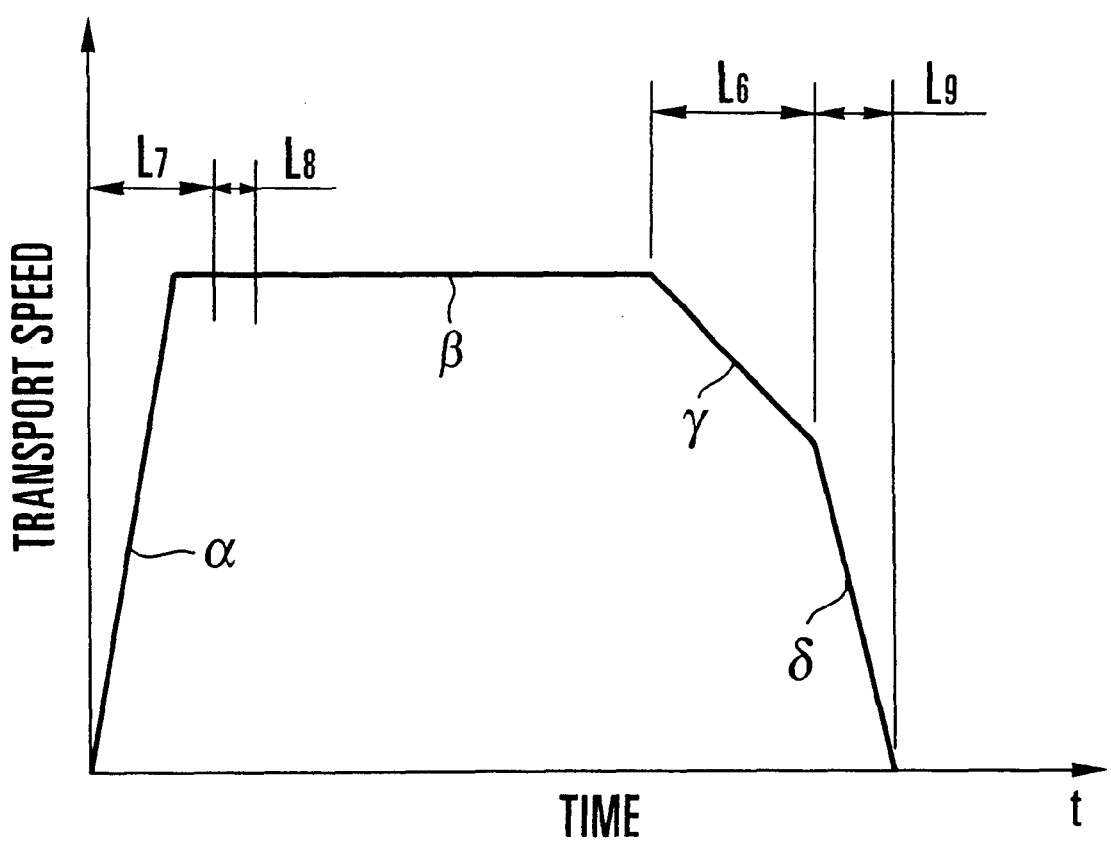
FIG. 4 is a graph showing a film transport speed in relation to time in the first embodiment.

FIG. 4 shows in a graph a relationship between a film transport speed and time. The relationship is shown in a state of being correlated to distances L7, L8, L6 and L9 which are indicated in FIG. 3.

Next, the operation of the camera arranged as described above is described with reference to FIG. 5 which is a flow chart of an operation of the control circuit 19 of FIG. 2 together with FIG. 6 which is a timing chart showing a one-frame film winding action.

Figure 5:
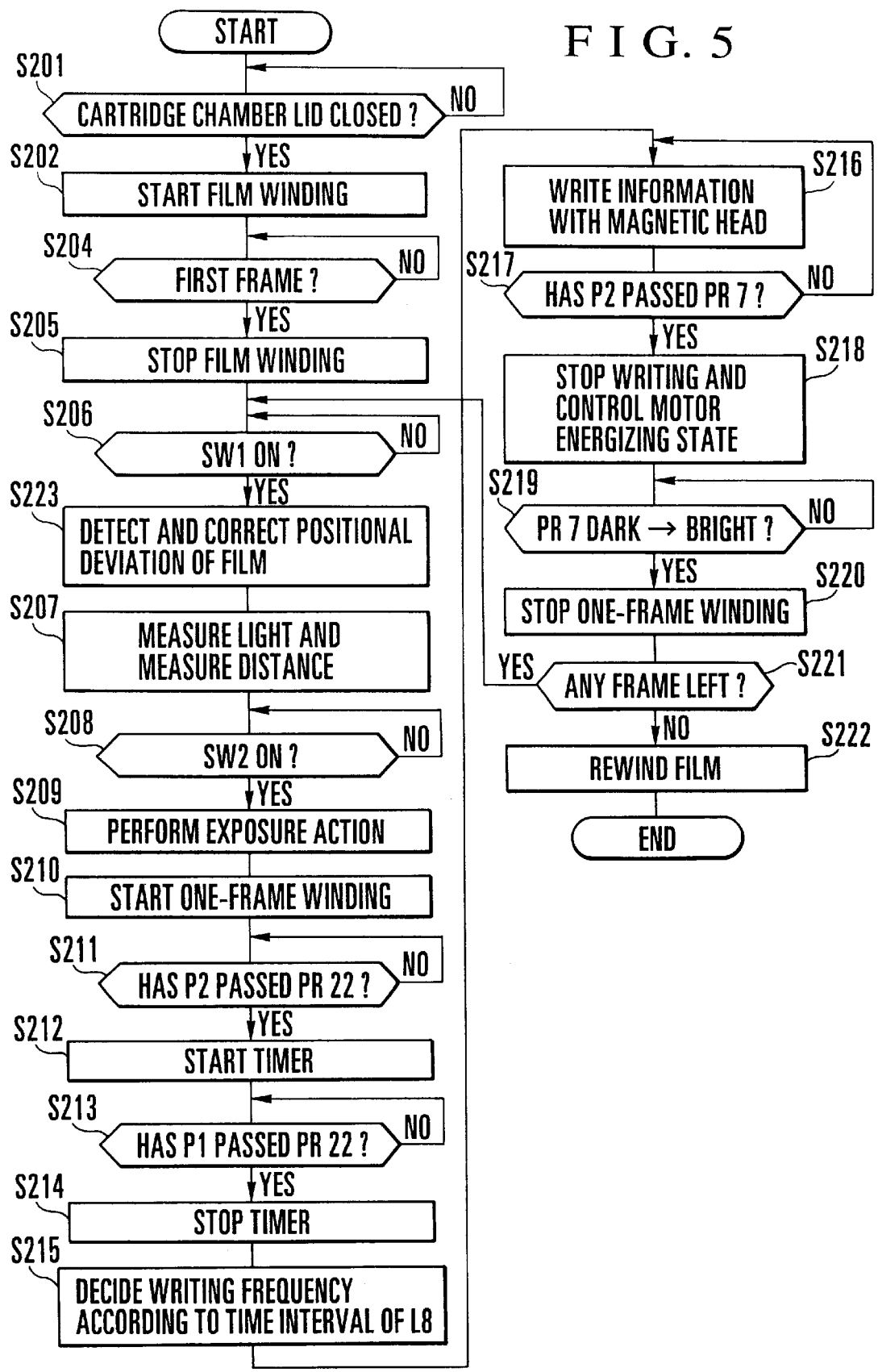
FIG. 5 is a flow chart showing an operation of a control circuit of the camera shown in FIG. 2.
Figure 6:
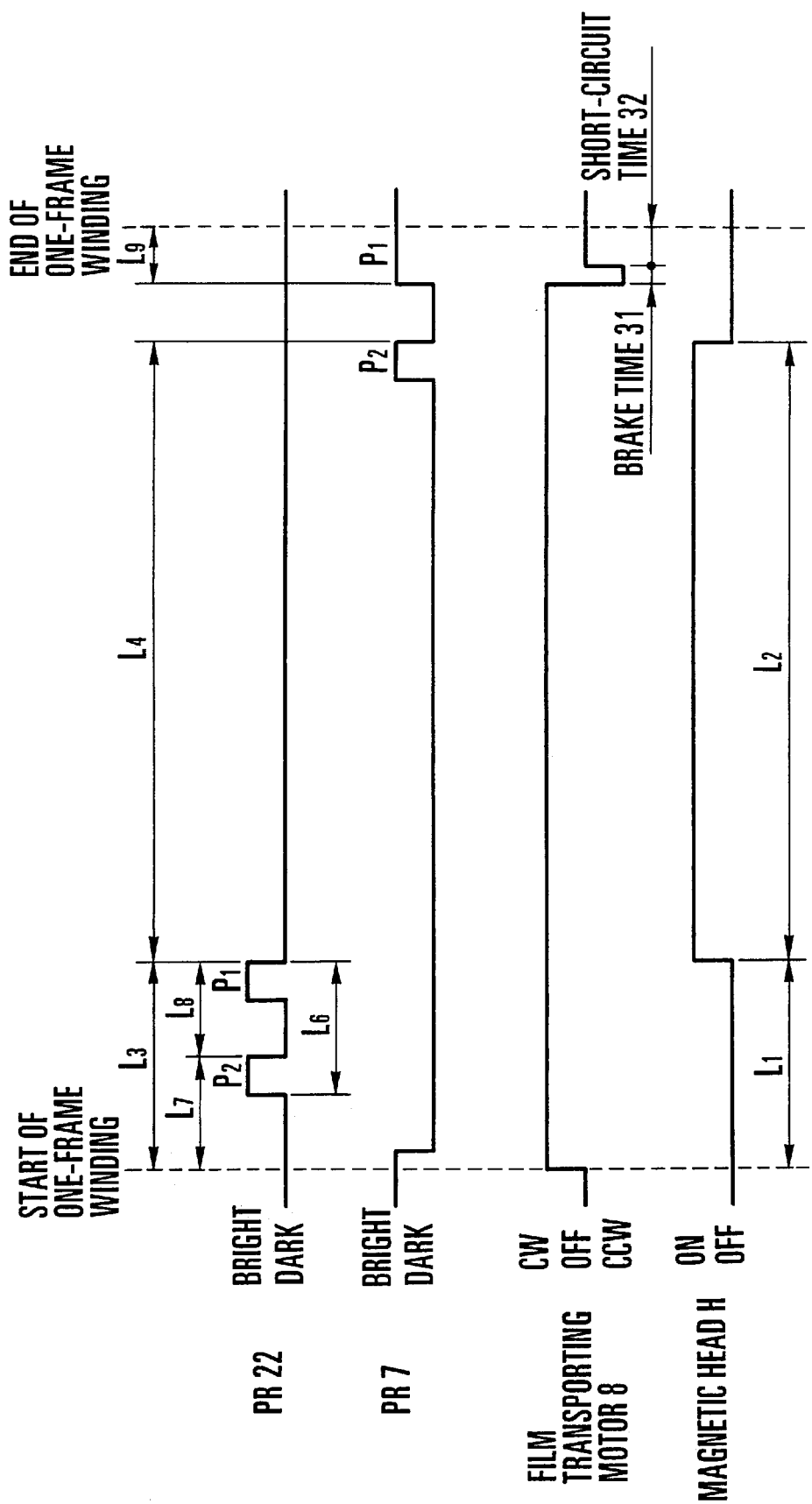
FIG. 6 is a timing chart showing the timing of one-frame winding in the first embodiment.

At a step S201 of FIG. 5, a check is made to find if a lid member of a cartridge chamber (not shown) of the camera is closed to turn on the lid switch 29 after the film cartridge C is inserted into the camera. If so, the flow of operation comes to a step S202.

At the step S202, the film transporting motor 8 is caused through the motor driver 28 to begin winding up the film F for automatic loading. At a step S204, a check is made to find if a first frame portion of the film F has reached an aperture position in the camera, by counting the number of frames on the basis of a detection signal (being indicated by "BRIGHT" in FIG. 6) which is outputted from the second photo-reflector 7 when detecting the perforation P1. If the first frame is found to have reached the aperture position, the flow comes to a step S205 (performing the same action as a step S219 which will be described later).

At the step S205, the film winding for automatic loading is brought to a stop by causing the film transporting motor 8 to cease driving (performing the same action as a step S220 which will be described later).

At a step S206, a check is made to find if the switch (SW1) 17 is in an on-state. If so, the flow proceeds to a step S207 through a step S223 which will be described later herein.

At the step S207, the light measuring sensor 4 and the distance measuring sensor 6a are driven to obtain information about a measured value of light and a measured value of a distance to an object to be photographed.

At a step S208, a check is made to find if the switch (SW2) 18 is in an on-state. If so, the flow comes to a step S209.

At the step S209, an exposure action is executed in a known manner. More specifically, the control circuit 19 obtains a lens position signal from the lens encoder 2b through the lens actuator 2a. After that, the control circuit 19 instructs the lens actuator 2a to stop driving the photo-taking lens 1, i.e., to stop performing a focusing action, when the photo-taking lens 1 has come to a position corresponding to the object distance data obtained at the step S207. Almost at the same time, the shutter 3 is opened for a shutter time decided by the output of the light measuring sensor 4 at the step S207. The shutter 3 is closed after the lapse of the shutter time. The shutter time and an aperture value used for the exposure action are stored in the RAM 21. A shot is thus taken for the first photographic picture plane Aa. Then, after a one-frame film winding action, a shot is taken for the next photographic picture plane Ab. Here, assuming that a shot for the photographic picture plane Ab has been completed, a film winding action on the photographic picture plane Ab is performed as follows.

At a step S210, the film transporting motor 8 is actuated through the motor driver 28 to begin winding up the photographic picture plane Ab (one-frame winding) of the film F. Then, the film F is transported in the direction of an arrow X.

At a step S211, a check is made to find if a perforation P2 which is one of the two perforations P1 and P2 provided in correspondence to the photographic picture plane Ab has passed the position of the first photo-reflector 22. If so, the flow comes to a step S212. As shown in FIG. 4, after the commencement of winding the film F, the film transport speed increases and then becomes constant when the perforation P2 has passed the first photo-reflector 22, i.e., when the film F has been transported a distance L7 (see FIG. 3), as indicated by an area α in FIG. 4.

At a step S212, an internal timer is started.

At a step S213, a check is made to find if a perforation P1 which is one of the perforations P1 and P2 provided in correspondence to the photographic picture plane Ac has passed the position of the first photo-reflector 22. If so, the flow comes to a step S214.

At the step S214, the internal timer is made to stop.

At a step S215, the frequency of information writing by the magnetic head H is decided according to the count number of the internal timer, that is, by measuring a time interval between the passing of the perforation P2 of the photographic picture plane Ab through the position of the first photo-reflector 22 and the arrival of the perforation P1 of the next photographic picture plane Ac at the same position, corresponding to a distance L8 shown in FIG. 3. This step is provided for the purpose of lowering the writing frequency when the film transport speed is low and increasing the writing frequency when the film transport speed is high, so that the number of bits written per unit distance can be made constant.

At a step S216, the magnetic head H is caused to begin writing data of varied kinds, such as a shutter speed and an aperture value, stored in the buffer 24, through the head amplifier 25 into the area Sb (FIG. 3). The start position of this information writing action is determined by a distance "L7+L8", i.e., a distance L3. Hence, L3=L1 (see FIG. 3).

At a step S217, a check is made to find if the perforation P2 provided for the photographic picture plane Ab has passed the position of the second photo-reflector 7. If not, the flow comes back to the step S216 to allow the information writing action to continue. If so, the flow comes to a step S218.

At the step S218, the process of information writing is immediately terminated by bringing the driving action on the magnetic head H to a stop. As a result, a state of L4=L2 is obtained, as shown in FIG. 3, and the information can be accurately written into the area Sb without deviating into another photographic picture plane. If the film cartridge C is taken out from the camera in this state and, after that, is again inserted into the camera, a discrimination can be made between an exposed state and an unexposed state of photographic frames by reading information out from the magnetic track T with the magnetic head H. Further, at the same time, the state of energizing the film transporting motor 8 is changed through the motor driver 28. More specifically, the motor 8 is prepared for stopping by changing its duty or by lowering a voltage, as shown at an area γ in FIG. 4.

At a step S219, a check is made to find if the perforation P1 provided for the photographic picture plane Ac has reached the position of the second photo-reflector 7, i.e., to find if a detection signal begins to be outputted from the second photo-reflector 7. If so, the flow comes to a step S220.

At the step S220, the winding action on the film F is immediately brought to a stop by causing the motor driver 28 to stop driving the film transporting motor 8. In this instance, the above-stated duty, a length of brake applying time 31 for stopping the film transporting motor 8, a length of time 32 for locking to a stopped state, etc., are set so that the perforation P1 stops at the middle of the front surface of the second photo-reflector 7 (i.e., in a state where the detection signal is being outputted from the second photo-reflector 7). The film transport cannot be instantly brought to a stop. As shown at an area δ in FIG. 4, the film F is moved forward to some extent by the force of inertia. Reference symbol L9 in FIG. 4 denotes this distance. However, by allowing the brake application to begin nearly concurrently with the commencement of detection of the perforation P1 by the second photo-reflector 7, the perforation P1 can be naturally brought to the middle of the front surface of the second photo-reflector 7. The photographic picture plane Ac thus can be brought to a stop in the aperture position.

At a step S221, a check is made to find if there is any photographic picture plane left unexposed on the film F (any remaining frame). If so, the flow comes to the step S206 for a next shot to be taken. If not, the flow comes to a step S222.

At the step S222, the film F is rewound by causing the motor driver 28 to drive the film transporting motor 8 in a direction reverse to the direction described above.

A series of actions then comes to an end.

The step S223 mentioned above is provided for detecting the positional deviation of the film F. The perforation P1 provided for the photographic picture plane Ac is normally brought to a stop in the middle of the front surface of the second photo-reflector 7 by the step S220. In other words, there is obtained a state in which a detection signal is outputted from the second photo-reflector 7. Therefore, by checking the output of the second photo-reflector 7 again at this step S223, it is possible to accurately find whether or not the position of the film F is deviating from the normal stop position (the position first found) either in the film winding direction or in the rewinding direction. In other words, if the detection signal is found outputted, the film F is considered not to be deviating from a correct position and the flow comes to the step S207. In actuality, since the perforation P1 has a certain width, some positional deviation of the film F might take place even when the detection signal is outputted. However, such positional deviation presents no problem, as long as the deviation is within such a range that allows the perforation P2 to be detected by the first photo-reflector 22 after the commencement of film winding. In a case where no detection signal is outputted, the film F is judged to have deviated from its normal position more than an allowable extent. In that case, the film transporting motor 8 is driven to bring the film F back to the normal stop position before the flow comes to the step S207.

Figure 7:
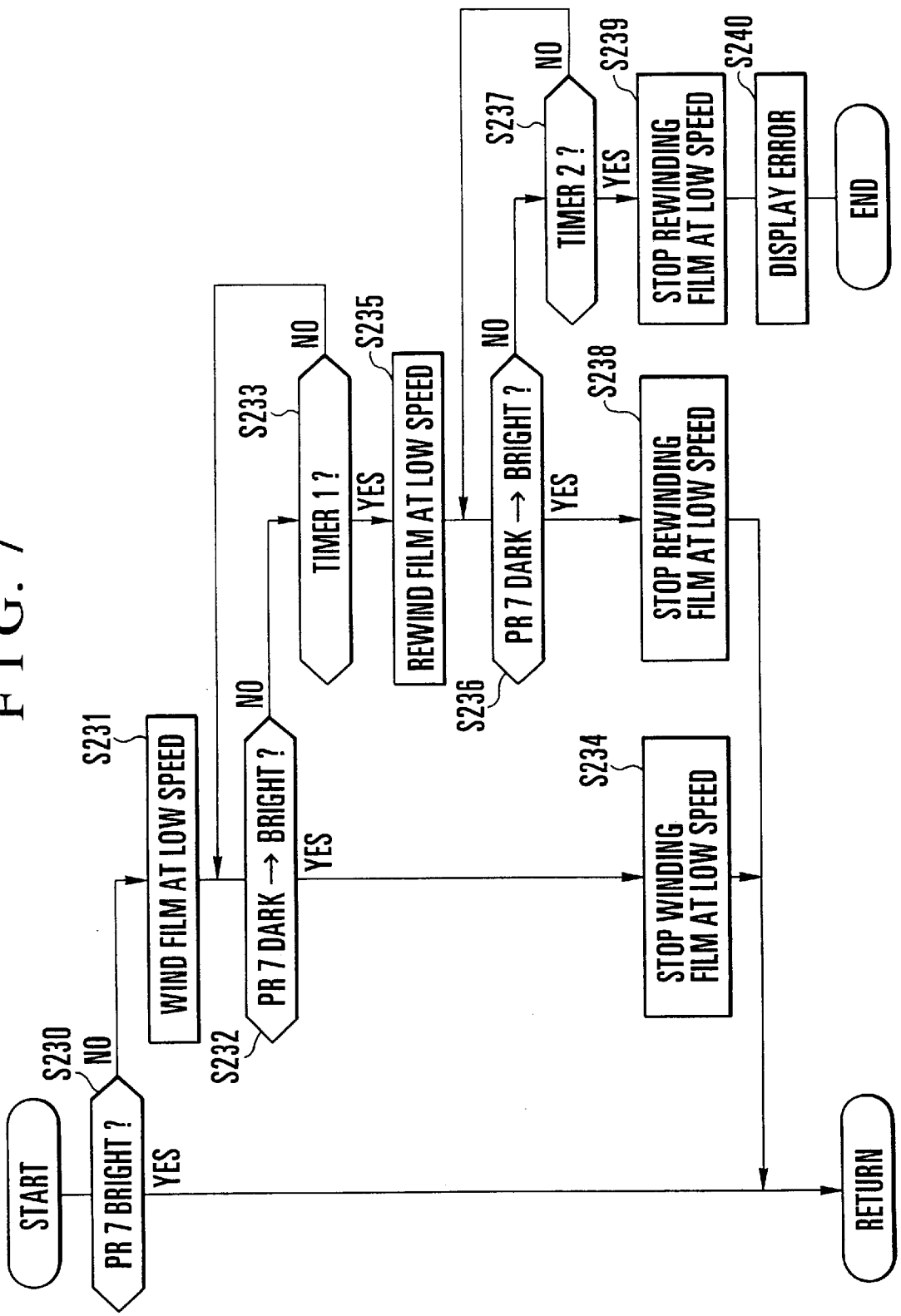
FIG. 7 is a flow chart showing a subroutine for detecting and correcting a positional deviation of a film in a step S223 which is included in the flow chart of FIG. 5.

FIG. 7 is a flow chart showing a subroutine of the step S223 provided for detecting and correcting the positional deviation of the film F. The details of this subroutine are described below with reference to FIG. 7.

Referring to FIG. 7, at a step S230, a check is made to find if a signal indicative of detection of the perforation P1 is outputted from the second photo-reflector 7. If so, the position of the film F is considered not to be deviating, and the subroutine comes to an end. If not, the position of the film F is considered to be deviating, and the flow comes to a step S231.

At the step S231, the motor driver 28 is caused to begin film winding at a low speed by operating the film transporting motor 8 at a lower speed than the speed at which one-frame film winding is normally performed.

At a step S232, a check is made to find if the perforation P1 has reached the position of the second photo-reflector 7 (to find whether the second photo-reflector brings to output a detection signal). If so, the flow comes to a step S234. If not, the flow comes to a step S233.

At the step S233, a check is made to find if a count time of a timer 1 set by the time measuring circuit 20 has elapsed before the perforation P1 reaches the position of the second photo-reflector 7. If not, the flow comes back to the step S232. If so, the positional deviation of the film F is judged to be in the reverse direction, and the flow comes to a step S235.

At the step S234, the subroutine is brought to an end by stopping the process of film winding.

At the step S235, the film transporting direction is reversed and the film is rewound at a lower speed than the normal speed of film rewinding.

At a step S236, a check is made in the same manner as at the step S232 to find if the perforation P1 has reached the position of the second photo-reflector 7. If so, the flow comes to a step S238. If not, the flow comes to a step S237.

At the step S237, a check is made to find if a count time of a timer 2 set by the time measuring circuit 20 has elapsed before the perforation P1 reaches the position of the second photo-reflector 7. If not, the flow comes back to the step S236. If so, it is considered that some error has occurred, and the flow comes to a step S239. Incidentally, the setting time of the timer 2 is longer than that of the timer 1, because the film F is transported in the forward direction.

At the step S238, an action is performed in the same manner as at the step S220 and then the subroutine is terminated with the rewinding of the film F brought to a stop.

At the step S239, the rewinding of the film F is brought to a stop by causing the motor driver 28 to stop driving the film transporting motor 8.

At a step S240, the display device 30 is caused to provide an error display to let the camera operator know the occurrence of some error.

Upon completion of these steps, the subroutine of detecting and correcting the positional deviation of the film F comes to an end.

Assuming that the position of the film F happens to deviate in the direction of film winding, if film winding is allowed to begin with the perforation P1 left in a state of having passed the position of the first photo-reflector 22, the magnetic head H is not driven (the flow is not allowed to proceed from the step S211 to the step S216) and information cannot be written into the area Sb of the magnetic track T. However, the first embodiment is arranged to bring the film F back to its initially stopped position before the commencement of film winding. This arrangement ensures that the perforation P1 always passes the position of the first photo-reflector 22 at the time of film winding, so that information can be written into the magnetic track T without fail.

While the step S223 is provided between the steps S206 and S207 in the case of the first embodiment described, the camera is arranged in actuality to detect and correct the positional deviation of the film F after the switch (SW1) 17 is turned on. However, the step S223 may be arranged to be executed when the main switch of the camera is turned on, or when the switch (SW2) 18 is turned on, or when the shutter release button is operated to other positions. Further, it is also possible that the step S223 may be executed at some other suitable timing. For example, the step S223 may be executed at intervals of time defined by providing a timer action after the end of one-frame winding process of the step S220. Further, the camera may be arranged such that, after detection of a positional deviation of the film, the camera operator is informed of the positional deviation by the display device 30 before the film is brought back to a normal stop position.

A second embodiment of this invention is next described as follows.

Figure 8:
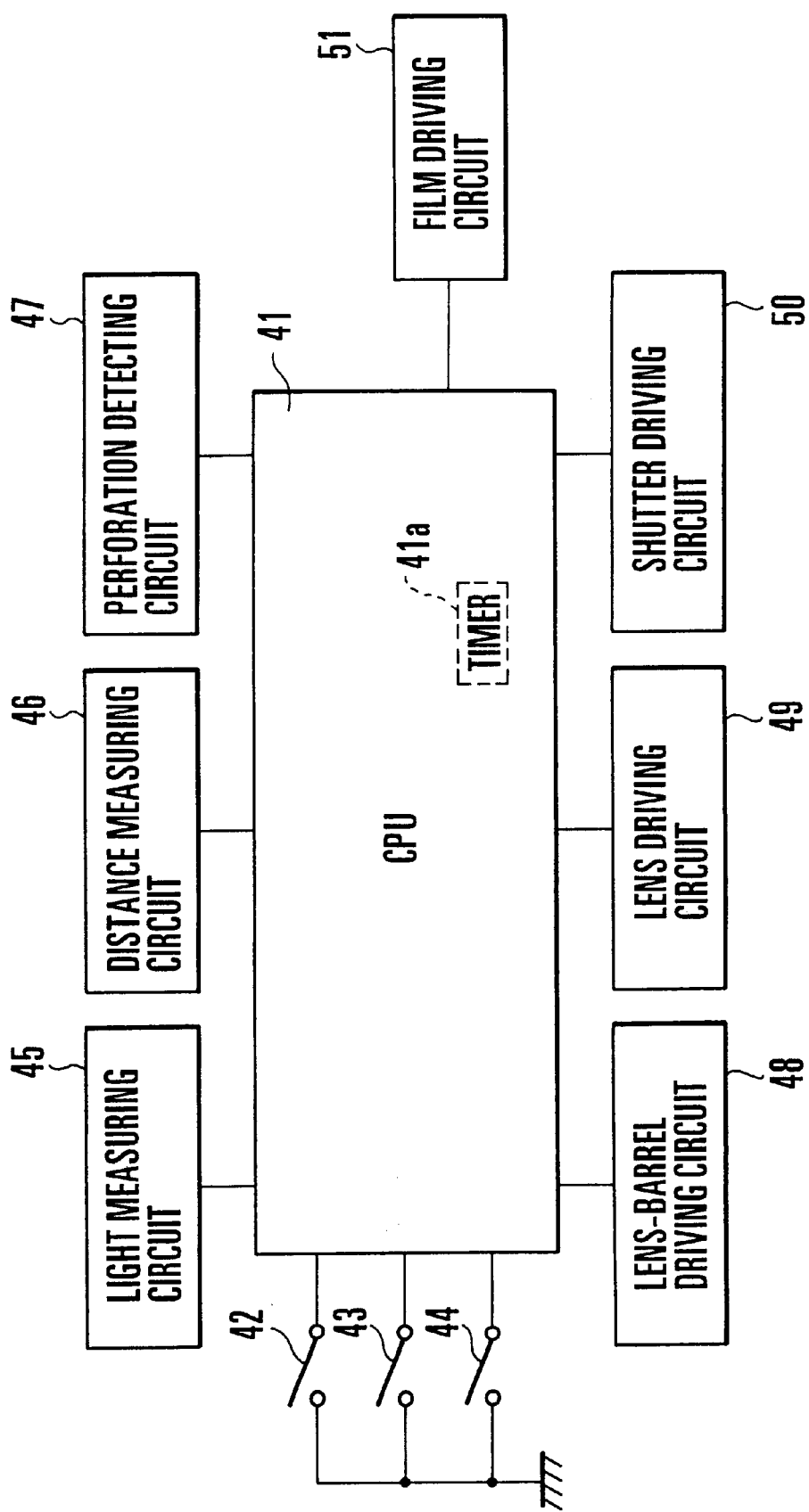
FIG. 8 is a block diagram showing a circuit arrangement of a camera which applies in common to second to fifth embodiments of this invention.

FIG. 8 is a block diagram showing the circuit arrangement of a camera which is the second embodiment of this invention. Referring to FIG. 8, the circuit arrangement includes a CPU 41 arranged to control a whole sequence of actions of the camera and provided with a timer 41a disposed within the CPU 41, a main (power supply) switch 42 arranged to start the CPU 41 to put the camera into a photographable state, a switch (SW1) 43 arranged to be turned on by a first stroke of a shutter release button when the shutter release button is pushed halfway, so as to begin a light measuring action and a distance measuring action, a switch (SW2) 44 arranged to be turned on by a second stroke of the shutter release button when the shutter release button is fully pushed, so as to perform various actions to drive a lens for focusing (focus adjustment), to open and close a shutter, to transport a film and so on, a light measuring circuit 45 arranged to detect the luminance of an object to be photographed, a distance measuring circuit 46 arranged to detect a distance to the object, a perforation detecting circuit 47 arranged to detect whether or not a perforation provided in the film is in a predetermined position, a lens-barrel driving circuit 48 arranged to drive the lens barrel for moving to its retracted position and drawn-out position and also for zooming, a lens driving circuit 49 arranged to drive a photo-taking lens for focus adjustment on the basis of information on the distance detected by the distance measuring circuit 46, a shutter driving circuit 50 arranged to control an exposure of the film on the basis of information on the luminance detected by the light measuring circuit 45, and a film driving circuit 51 arranged to drive the film for winding and rewinding on the basis of the detection signal provided by the perforation detecting circuit 47.

Figure 9:
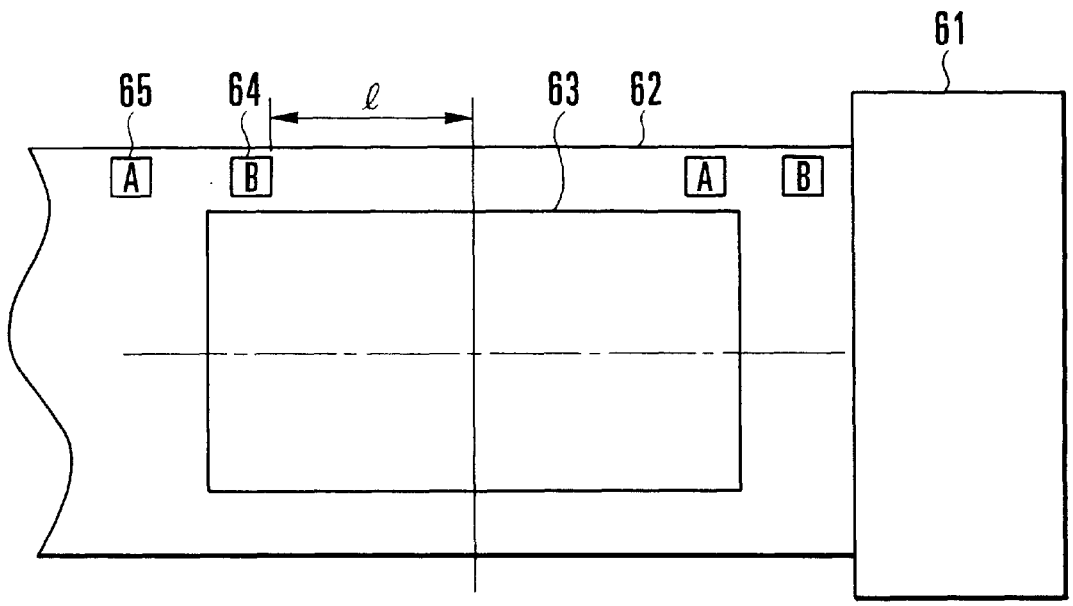
FIG. 9 shows a film cartridge to be used for the camera arranged as each of the second to fifth embodiments.

FIG. 9 shows a film cartridge to be used for the camera which is the second embodiment of this invention. The film cartridge includes a cartridge shell 61, a film 62, a film exposing part 63 and perforations 64 and 65 provided in the film 62. The film exposing part 63 is determined by a distance l between the middle of the film exposing part 63 and the perforation 64. Therefore, a photo-reflector of the perforation detecting circuit 47 is arranged to come at a middle point between two edges of the perforation 64 which is at the distance l from the middle of an exposure part of the camera.

The actions of the circuits shown in FIG. 8 are next described with reference to FIG. 14 which is a flow chart showing an operation of the CPU 41.

Figure 14:
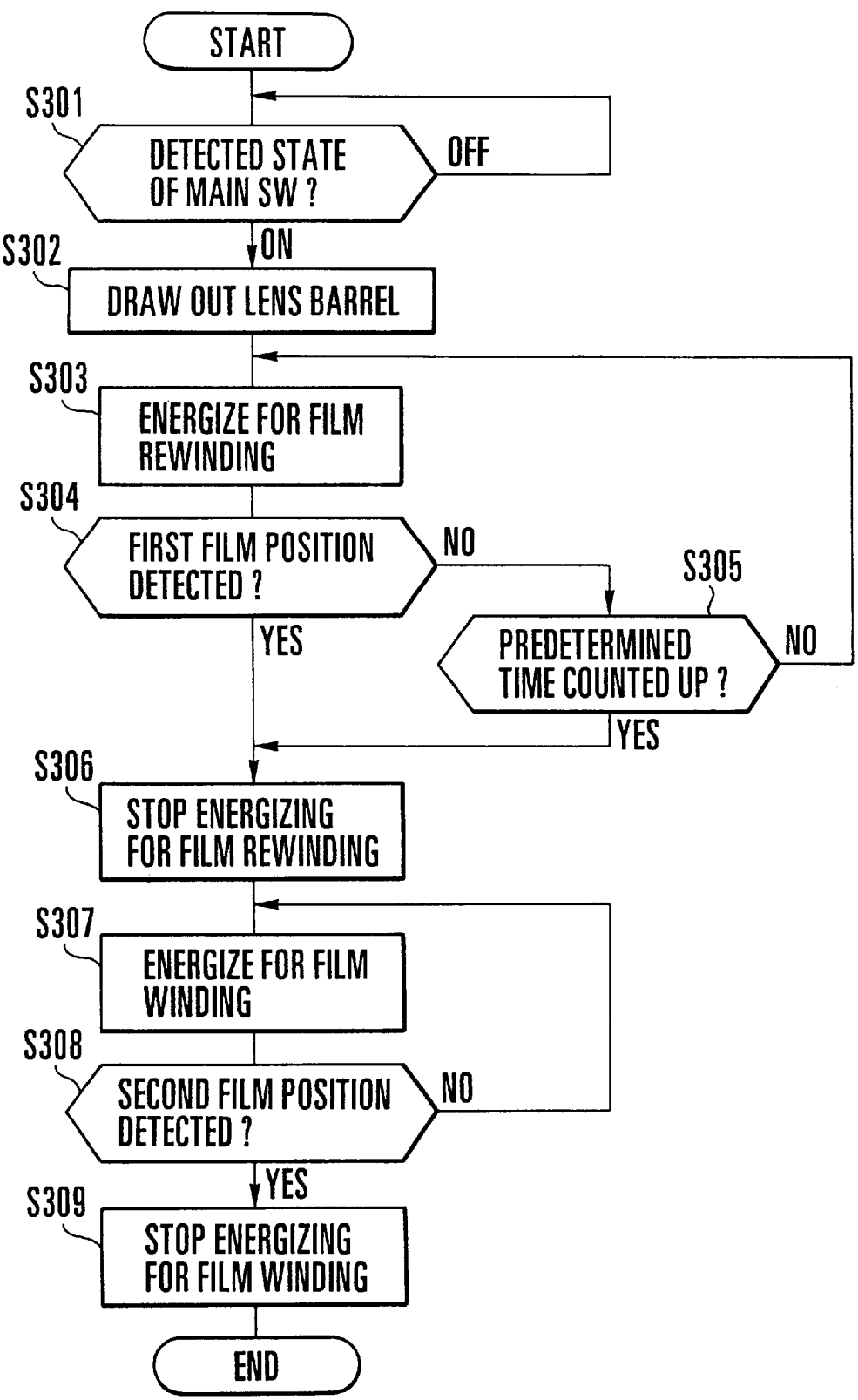
FIG. 14 is a flow chart showing an operation of a CPU 41 of FIG. 8 performed in the second embodiment.

Referring to FIG. 14, at a step S301, a check is made for the state of the main switch 42. If the main switch 42 is found to be in an off-state, the check is continuously made until the main switch 42 comes to be found in an on-state. When the main switch 42 is found to be in an on-state, the flow comes to a step S302. At the step S302, the lens-barrel driving circuit 48 is caused to draw out the lens barrel from its retracted position to a photographable position. At a step S303, the film driving circuit 51 is caused to perform an energizing action for rewinding the film. At a step S304, the perforation detecting circuit 47 is caused to perform a first film position detection.

The first film position detection is made to find if a bright signal serving as a signal for detection of each perforation is detected twice after the commencement of film rewinding at the step S303. If not, the flow comes to a step S305. At the step S305, a check is made, through the timer 41a disposed within the CPU 41, to find if the first film position detection is completed within a predetermined period of time. If so, the flow comes immediately to a step S306 to bring the energizing action for film rewinding to a stop. If not, the flow comes to the step S306 after the lapse of the predetermined period of time, to terminate the film rewinding energizing action.

More specifically, in a state in which the film position is not deviating, each perforation of the film is in a position located the distance 1 away from the middle of the film exposing part 63. The photo-reflector of the perforation detecting circuit 47 is disposed in this position. When the film is moved by the rewinding action at the step S303 in the direction of an arrow R as shown in FIG. 10, the signal of the photo-reflector of the perforation detecting circuit 47 has a waveform 1 as shown in FIG. 11, in which a second "bright" part of the signal for the perforation A (65) is detected within a predetermined period of time after a first "bright" part of the signal for the perforation B (64) is detected at the commencement of film rewinding, and the film rewinding energization is brought to a stop at the step S306 at a point beyond the perforation A.

Figure 10:
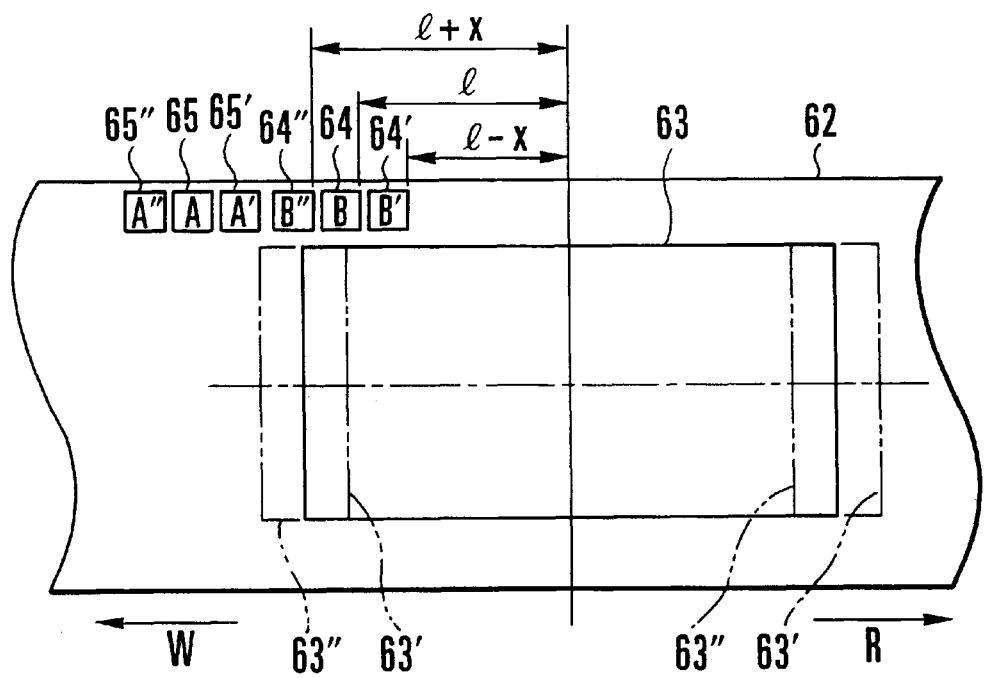
FIG. 10 shows a state in which a positional deviation of the film of the film cartridge shown in FIG. 9 has occurred.
Figure 11:
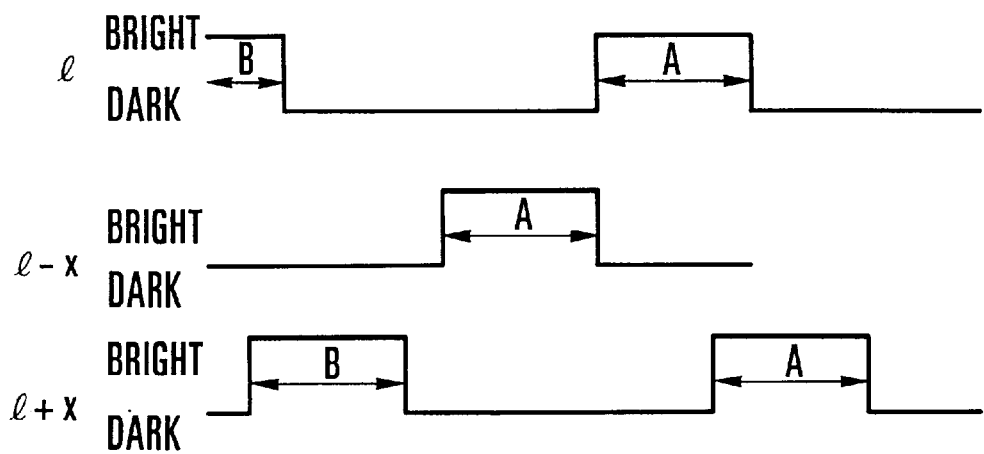
FIG. 11 shows signals relative to perforations as detected in various states of the positional deviation of the film shown in FIG. 10.

In a case where the film position, i.e., the position of the perforation B, is caused, by a shake or the like, to deviate from a correct position relative to the photo-reflector of the perforation detecting circuit 47 toward the cartridge shell 61 as represented a perforation 64' or B' in FIG. 10, the distance between the middle of the exposure part of the camera and the perforation B' becomes "1−x" as shown in FIG. 10. With the film rewinding energizing action of the step S303 allowed to begin in this state, when the film 62 moves in the direction of the arrow R as shown in FIG. 10, the photo-reflector signal of the perforation detecting circuit 47 comes to have a waveform 1−x as shown in FIG. 11. Then, a "dark" part of the photo-reflector signal is detected at the commencement of the film rewinding. After that, a bright part of the signal for perforation signal A is detected as a first perforation signal. The rewinding energizing action is then allowed to continue for a predetermined period of time. In this case, since the second bright part cannot be detected within the predetermined period of time, the bright part first detected is judged to be the signal for the perforation A. Then, after the lapse of the predetermined time of the step S305, the flow comes to the step S306 to stop energizing for film rewinding.

If the film position, i.e., the position of the perforation B, is caused, by a shake or the like, to deviate toward a film take-up spool from a correct position relative to the photo-reflector of the perforation detecting circuit 47, as indicated by a perforation 64" or B" in FIG. 10, the distance between the middle of the exposure part of the camera and the perforation B" becomes "1+x" as shown in FIG. 10. With the film rewinding energizing action of the step S303 allowed to begin in this state, when the film 62 moves in the direction of the arrow R as shown in FIG. 10, the photo-reflector signal of the perforation detecting circuit 47 comes to have a waveform 1+x as shown in FIG. 11. Then, a "dark" part of the photo-reflector signal is detected at the commencement of the film rewinding. After that, a first bright part of the signal for perforation signal B is detected. Further, during the process of film rewinding for the predetermined period of time, a second bright part of the signal for the perforation A is detected. Then, the flow comes to the step S306 to stop energizing for film rewinding.

With the embodiment arranged as described above, in all cases, the perforation A is located in a position obtained by rewinding the film away from the position of the photo-reflector of the perforation detecting circuit 47 after the film rewinding energizing action is brought to a stop at the step S306.

Figure 12:
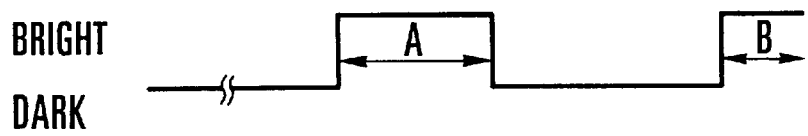
FIG. 12 shows a signal relative to perforations as detected in positioning the film.
Figure 13:
FIG. 13 shows a signal relative to perforations as detected in winding the film as much as a one frame portion thereof.

At a next step S307, the film driving circuit 51 is caused to perform film winding by changing the film rewinding energizing action to a film winding energizing action. At a step S308, a second film position detection is executed. The second film position detection is executed as follows. As mentioned above, the perforations A and B are located in positions obtained by rewinding the film away from the position of the photo-reflector of the perforation detecting circuit 47 after the film rewinding energizing action is brought to a stop in all cases. Therefore, to adjust the film position to a photographing position, the film is wound up in such a way as to adjust the perforation B to the position of the photo-reflector of the perforation detecting circuit 47. In other words, as shown in FIG. 12, with a bright part of the signal for the perforation A detected after a dark part indicating no perforation, another dark part between the perforations A and B is detected. Then, a bright part for the next perforation B is detected to terminate the second film position detection. The flow of operation then comes to a step S309 to cause the film driving circuit 51 to stop energizing for film winding. A sequence of actions of the steps from S303 through S309 described above effectively corrects the deviations of the film exposing position due to a shake of the camera, etc.

A third embodiment of this invention is next described with reference to FIG. 15 which is a flow chart showing an operation of the CPU 41 of FIG. 8. The circuit arrangement of the third embodiment is the same as that of the second embodiment. The third embodiment differs mainly in that the positional deviation of the film is corrected when the switch (SW1) 43 is turned on.

Figure 15:
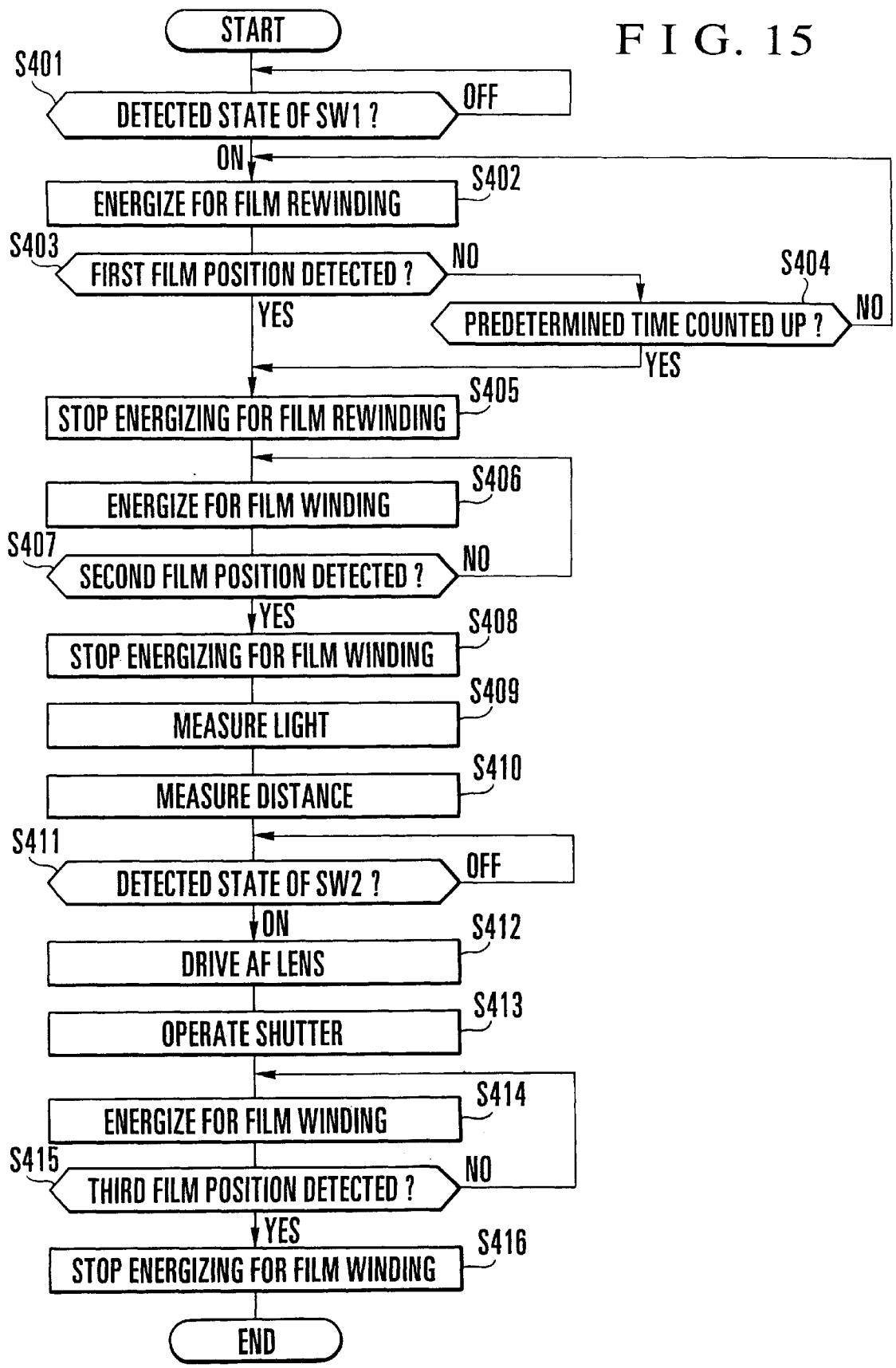
FIG. 15 is a flow chart showing an operation of the CPU 41 of FIG. 8 performed in the third embodiment.

Referring to FIG. 15, at a step S401, a check is made for the state of the switch (SW1) 43. If the switch (SW1) 43 is found to be in an on-state, the flow of operation comes to a step S402 to execute the actions of steps S402 to S408 in the same manner as the steps S303 to S309 of FIG. 14 described in the foregoing. Any deviation of the film exposing position due to a shake, vibrations or the like is corrected by a sequence of actions of the steps S402 to S408.

At a next step S409, the light measuring circuit 45 is caused to detect the luminance of an object to be photographed. At a step S410, the distance measuring circuit 46 is caused to detect a distance to the object. At a step S411, the flow waits for turning-on of the switch (SW2) 44. When the switch (SW2) 44 is found to have been turned on, the flow comes to a step S412. At the step S412, the lens driving circuit 49 is caused to adjust the focus of the photo-taking lens on the basis of the object distance measured at the step S410. A focus position for the object is adjusted to the surface of the film.

At a step S413, the shutter driving circuit 50 is caused to perform an exposure action on the basis of the luminance measured at the step S409. At a step S414, the film driving circuit 51 is caused to perform an energizing action for film winding to move the exposing part of the film from one frame portion to a next frame portion. At a step S415, the perforation detecting circuit 47 is caused to perform a third film position detection, in which a dark part of the photo-reflector signal indicating no perforation is detected since a bright part of the signal for the perforation B of an exposed frame, a dark part indicating no perforation is next detected since a bright part of the signal for the perforation A, and a bright part of the signal for the perforation B of a next frame is detected to complete a one-frame film transporting action. At a step S416, the film driving circuit 51 is caused to bring the process of film winding energization to a stop. A sequence of photographing actions then comes to an end.

Figure 16:
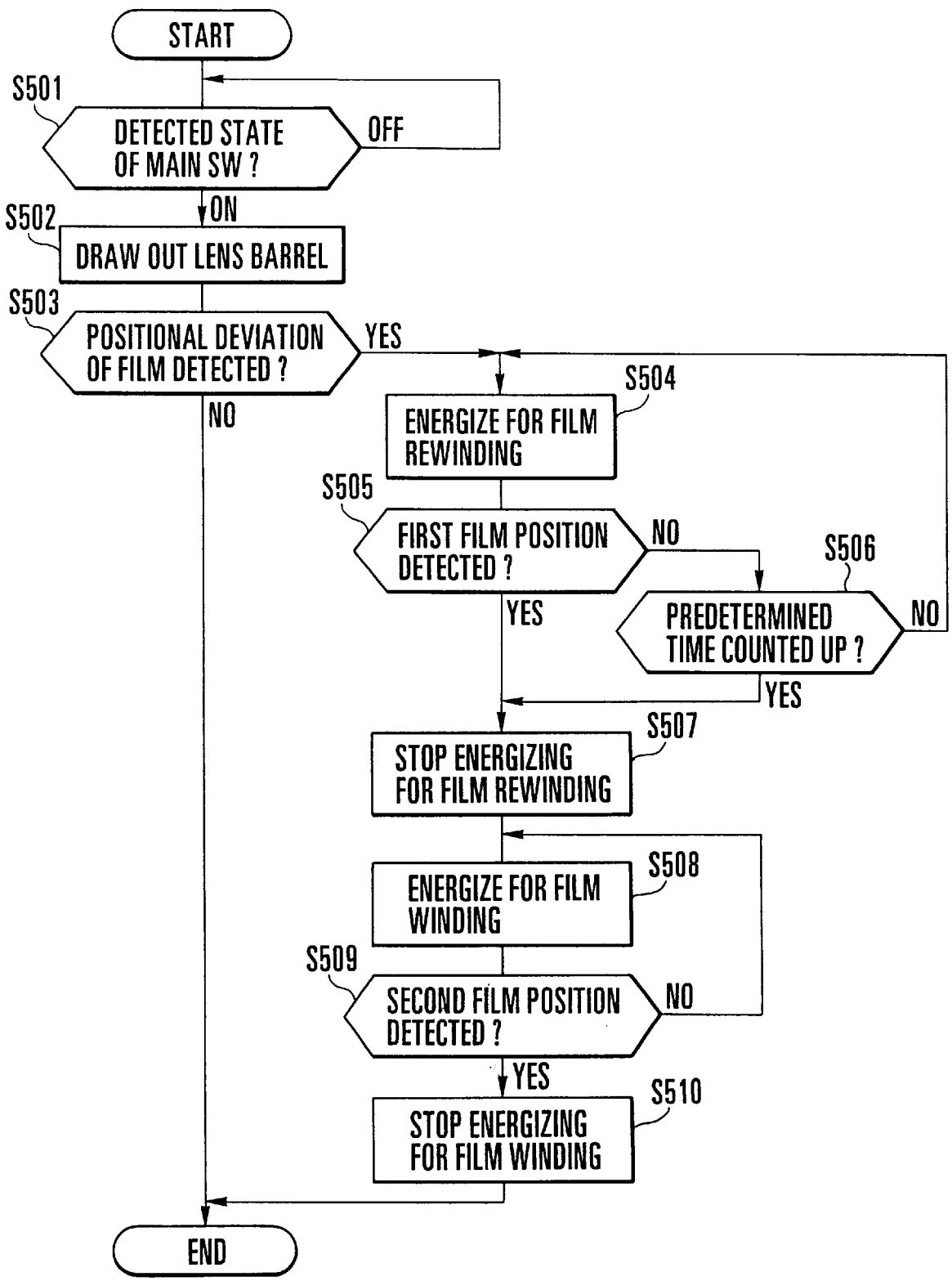
FIG. 16 is a flow chart showing an operation of the CPU 41 of FIG. 8 performed in the fourth embodiment.

A fourth embodiment of this invention is next described with reference to FIG. 16 which is a flow chart showing an operation of the CPU 41 of FIG. 8. The circuit arrangement of the fourth embodiment is the same as that of the second embodiment. Like in the case of the second embodiment, the fourth embodiment performs control to correct any deviation of an exposing position when the main switch 42 is turned on. In FIG. 16, steps S501 and S502 are identical with the steps S301 and S302 of FIG. 14. At a next step S503, a check is made through the perforation detecting circuit 47 to detect a positional deviation of the film. If the perforation detecting circuit 47 detects a bright part of the photo-reflector signal for the perforation B thus indicating no positional deviation of the film, a sequence of actions comes to an end. In a case where the film position is deviating, on the other hand, the perforation detecting circuit 47 detects, at the step S503, a dark part of the signal indicating the absence of the perforation B. In that case, the flow comes to a step S504 to execute control at steps S504 to S510 in the same manner as the steps S303 to S309 of FIG. 14. The sequence of actions then comes to an end.

The arrangement of controlling the film exposing position after detecting a deviation or no deviation of the film position, as described above, enables the fourth embodiment to reduce a necessary number of steps for the position control.

A fifth embodiment of this invention is next described with reference to FIG. 17 which is a flow chart showing an operation of the CPU 41 of FIG. 8. The circuit arrangement of the fifth embodiment is the same as that of the second embodiment shown in FIG. 8. Like in the case of the third embodiment, the fifth embodiment controls and corrects a deviation of the film exposing position when the switch (SW1) 43 is turned on. Referring to FIG. 17, at a step S601, a check is made to find if the switch (SW1) 43 is in an on-state. If so, the flow of operation comes to a step S602. At the step S602, an action of detecting a positional deviation of the film is performed in the same manner as the step S503 of the flow chart of the fourth embodiment shown in FIG. 16. If the film position is found not to be deviating, the flow comes to a step S610 for a light measuring action. Steps S610 to S617 are executed in the same manner as the steps S409 to S416 of FIG. 15 which shows the third embodiment. If the film position is found to be deviating at the step S602, on the other hand, the flow comes to a step S603 for a film rewinding energizing action. Then, steps S603 to S617 are executed in the same manner as the steps S402 to S416 of FIG. 15 which shows the third embodiment. A sequence of actions then comes to an end.

Further, each of the second to fifth embodiments also may be arranged to change the timing of making a check for the positional deviation of the film, like in the case of the first embodiment, to any other suitable timing, such as a point of time when the shutter release button is pushed to its second stroke position.

Each of the embodiments described above is arranged to detect the film position through perforations. However, in accordance with the invention, this method may be changed to detect the film position in any other suitable method, such as detecting it through information magnetically recorded on the film.

Further, in accordance with this invention, the film transporting direction for correcting the positional deviation of the film may be arranged to be opposite to the film transporting direction of each embodiment described.

In each of the embodiments described above, the photo-reflectors are used in detecting the perforations of the film. However, this detecting method may be changed to any other suitable method. For example, it may be changed to use a pulse plate or the like.

Further, the shutter release button in each embodiment described above may be a shutter release member of another form.

Further, the display device in the first embodiment may be any indication device for giving a warning, such as warning by sound.

Further, in accordance with this invention, the software and hardware arrangements of the embodiments described may be replaced with one another as desired.

This invention applies not only to films but also to any other image recording medium.

This invention is applicable not only to an apparatus using the film cartridge of the kind described in the foregoing but also to apparatuses using cartridges of some other kind or cartridges containing image recording media other than films.

While this invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

Further, the individual components shown in schematic or block form in the drawings are all well-known in the camera arts and their specific construction and operation are not critical to the operation or best mode for carrying out the invention.

Further, this invention may be carried out by combining as necessary the embodiments or their technological elements described in the foregoing.

Further, this invention applies to cases where either the whole or a part of claims or the arrangement of each embodiment described forms one apparatus or is used in combination with some other apparatus or as a component of an apparatus.

Further, this invention is applicable to cameras of varied kinds, such as a single-lens reflex camera, a lens-shutter type camera, a video camera, etc., optical apparatuses other than cameras, other apparatuses, devices adapted for cameras, optical apparatuses and other apparatuses, and component elements forming these apparatuses and devices.

What is claimed is:

1. An apparatus comprising:
    a) a film transport device which transports a film;
    b) means for counting a predetermined time;
    c) determination means having a sensor which detects a state of perforation of the film, for determining whether the film standing still is at a proper position or not; and
    d) a control device which controls the film transport device to transport the film in one direction for said predetermined time when the position of the film standing still is determined not to be proper by said determination device, and then to transport the film in a reverse direction.

2. An apparatus according to claim 1, wherein said determination device determines whether or not the position of the film is proper by detecting whether a perforation of the film is at a proper position.

3. An apparatus according to claim 2, wherein said transport in said reverse direction of said film by said transport device continues until when said perforation of the film is detected to be at a proper position by the determination device.

4. An apparatus according to claim 1, wherein said sensor detects the perforation state of the film by detecting perforation of the film, and said transport of the film in said one direction is stopped even before the predetermined time passes when said sensor detects the perforation of the film.

5. An apparatus according to claim 1, further comprising a main switch which activates the apparatus, whereby the determination device operates in response to turning-on of the switch.

6. An apparatus according to claim 1, wherein the apparatus is a camera.

7. An apparatus according to claim 6, wherein the determination device operates in response to an operation of a release button.

8. An apparatus according to claim 6, wherein the determination device operates in response to a first stroke of depressing operation of a release button.

9. An apparatus according to claim 6, wherein the determination device operates in response to a second stroke of depressing operation of a release button.

10. An apparatus comprising:
   a) a film transport device which transports a film;
   b) means for counting a predetermined time;
   c) determination means having a sensor which detects a state of perforation of the film, for determining whether the film standing still is at a proper position or not; and
   d) a control device which controls the film transport device to transport the film in one direction until a state of perforation of the film is detected or to transport the film in one direction until said predetermined time passes and then to transport the film in a reverse direction when a position of the film standing still is determined to be not proper by the determination device.

11. An apparatus according to claim 10, wherein the determination device determines whether or not the position of the film is proper by detecting whether or not the perforation of the film is at a proper position.

12. An apparatus according to claim 10, wherein said sensor detects the perforation state of said film by detecting the perforation of said film, and said transport of the film in said reverse direction continues until said sensor detects the perforation of the film to be at a proper position.

13. An apparatus according to claim 10, further comprising a main switch which activates the apparatus, whereby the determination device operates in response to turning-on of the switch.

14. An apparatus according to claim 10, wherein the apparatus is a camera.

15. An apparatus according to claim 14, wherein the determination device operates in response to an operation of a release button.

16. An apparatus according to claim 14, wherein the determination device operates in response to a first stroke of depressing operation of a release button.

17. An apparatus according to claim 14, wherein the determination device operates in response to a second stroke of depressing operation of a release button.

* * * * *